United States Patent [19]

Handley et al.

[11] Patent Number: 4,990,033
[45] Date of Patent: Feb. 5, 1991

[54] METHOD AND APPARATUS FOR BLOWING AN OPTICAL FIBRE MEMBER

[76] Inventors: Graham R. Handley, 79 Arrowe Park Road, Upton, Wirral, England, 149 0UG; Neville J. Ditchfield, 19 Glencagles Close, Vicars Cross, Chester, England, C305HW; Ronald B. Radcliffe, 46 Merllyn Road, Rhyl, Clwyd, England, LL18 4HH

[21] Appl. No.: 275,126

[22] Filed: Nov. 22, 1988

[30] Foreign Application Priority Data

Nov. 25, 1987 [GB] United Kingdom ............... 87 27581

[51] Int. Cl.⁵ .............................................. B65G 51/04
[52] U.S. Cl. .................................. 406/82; 254/134.4; 406/93; 406/195
[58] Field of Search ................. 254/134.4; 406/51, 77, 406/82, 154, 176, 179, 195, 196, 93

[56] References Cited

U.S. PATENT DOCUMENTS

| | | | |
|---|---|---|---|
| 2,920,922 | 1/1960 | Minnick et al. | 406/195 |
| 3,433,424 | 3/1969 | Rover et al. | 242/47 |
| 4,332,436 | 6/1982 | Adorni et al. | 350/96.23 |
| 4,437,799 | 3/1984 | Liu et al. | 406/195 |
| 4,545,714 | 10/1985 | Johnson et al. | 406/82 |

FOREIGN PATENT DOCUMENTS

| | | |
|---|---|---|
| 0108590 | 1/1983 | European Pat. Off. . |
| 0135132 | 8/1984 | European Pat. Off. . |
| 0287225 | 3/1988 | European Pat. Off. . |
| 3340972 | 5/1985 | Fed. Rep. of Germany . |
| 1200392 | 12/1959 | France ................................... 406/82 |
| 2005216 | 4/1979 | United Kingdom . |
| 2122367 | 5/1982 | United Kingdom . |
| 2169722 | 12/1985 | United Kingdom . |
| 2179471 | 8/1986 | United Kingdom . |

OTHER PUBLICATIONS

Albert Gyger, Power and Communication Cables Designed for Later Insertion of Optical Fibers; Information Wire and Cable Symposium Proceedings 1985 pp. 300–304.

Primary Examiner—Sherman D. Basinger
Assistant Examiner—Stephen P. Avila
Attorney, Agent, or Firm—Darby & Darby

[57] ABSTRACT

An apparatus is provided for introducing at least one optical fiber member into a tubular passageway. The apparatus comprises a pressure vessel for receiving the optical fiber member, the vessel either containing compressed air or other gas or being provided with an inlet by means of which compressed gas can be introduced. The vessel is connected to the passageway via a fiber-introducing device, e.g. a venturi or a mechanical device, which creates slack in the optical fiber member.

12 Claims, 3 Drawing Sheets

METHOD AND APPARATUS FOR BLOWING AN OPTICAL FIBRE MEMBER

This invention relates to a method and apparatus for blowing an optical fiber member.

A method is known from EP-A-108590 for installing an optical fiber member in a tubular passageway using a flow of air which travels along the tubular passageway in the desired direction of travel of the optical fiber member. For this purpose the optical fiber member comprises an outer sheath surrounding one or more optical fibers, the sheath being of low density so as to facilitate its being carried by the flow of air. One feature of the method and apparatus described in EP-A-108590 is that the optical fiber member is introduced into the tubular passageway through a pressurised blowing head via a seal, which must allow the fiber member to pass through freely and must minimize the escape of air. To introduce the optical fiber member it passes between a pair of drive wheels located within the blowing head. The drive wheels engage the optical fiber member in the nip between the wheels and impart a longitudinal force to the optical fiber member in the direction of introduction.

An object of the present invention is to provide a method and apparatus for introducing one or more optical fiber members into a tubular passageway which avoids the need for a seal around the fiber member and eliminates rearward escape of air and reverse viscous drag on the fiber downstream of the wheels. This is particularly advantageous in the case of optical fiber members which have only a single optical fiber in a sheath, since such members are so lacking in rigidity that applying an effective longitudinal force to them by means of drive wheels is difficult, e.g. optical fiber members in which the product of Young's modulus and the second moment of area, a product normally denoted as EI, is of the order of $10^{-6}$ Nm$^2$.

According to the present invention there is provided an apparatus for introducing at least one optical fiber member into a tubular passageway, comprising a pressure vessel for receiving the optical fiber member, the vessel either containing a fluid under super-atmospheric pressure or being provided with an inlet by means of which such fluid can be introduced; means defining a path for the optical fiber member to travel from the vessel into the tubular passageway; and fiber introducing means for creating slack in the optical fiber member as it travels along the said path.

Three embodiments of the invention are shown in the accompanying drawings, in which.

Figure 1:
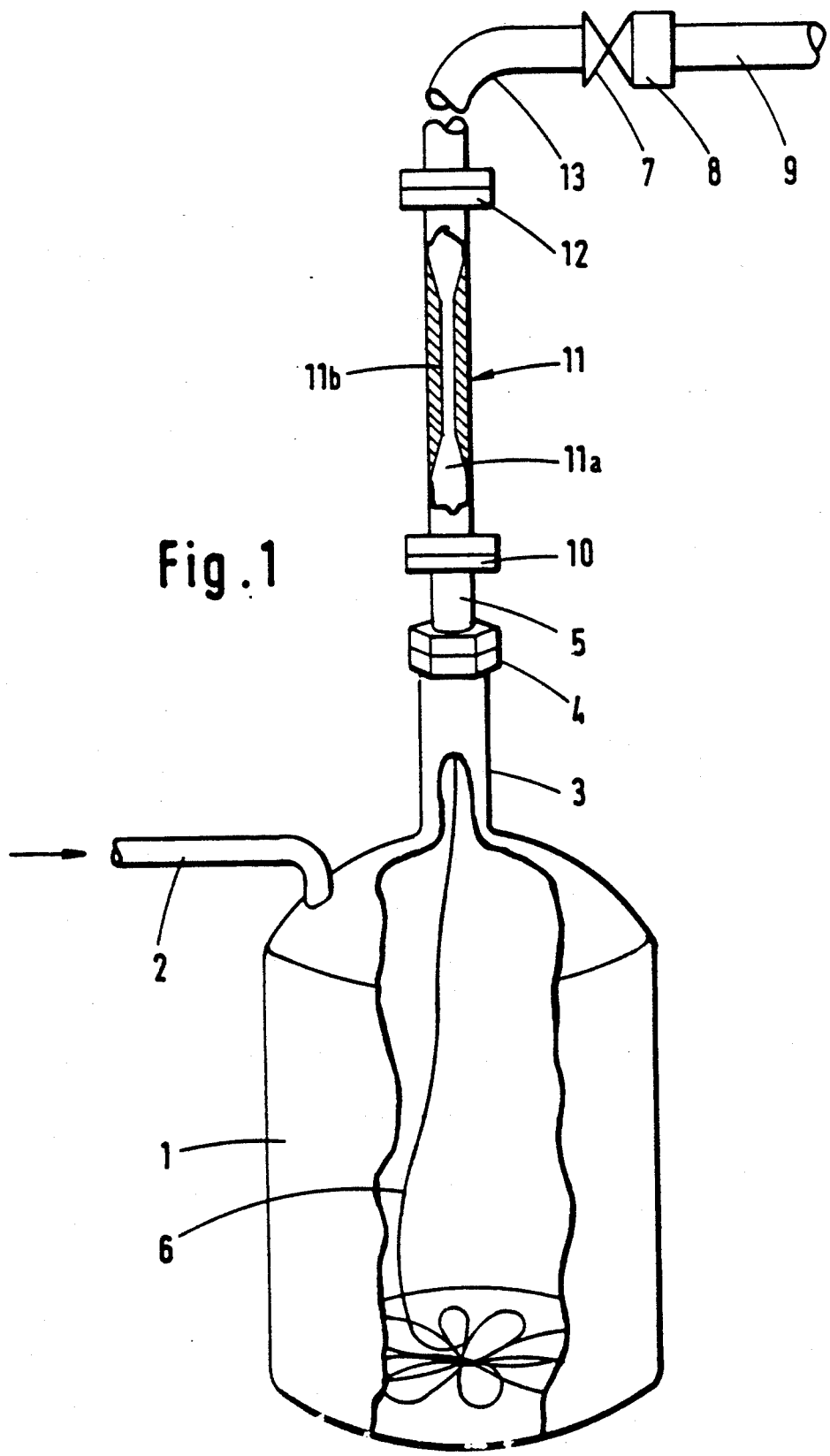
FIG. 1 is a diagrammatic perspective view of a first embodiment.

The embodiment shown in FIG. 1 comprises a vessel 1 capable of withstanding a considerable pressure of pressurised air or other gas therewithin. Typically, the pressure in the vessel might be in the region of 150 psig. An inlet 2 is provided for introducing compressed air of low moisture content into the vessel. The inlet is provided with a valve (not shown) to enable it to be closed. The vessel 1 has an outlet tube 3 which is formed integrally with the remainder of the vessel and which is connected via suitable connectors 4 to a flexible armoured hose 5.

The hose 5 is connected via connectors 10 to a venturi tube 11 having an internally convergent portion 11a, a constant diameter portion 11b, and a divergent portion 11c. The venturi tube 11 is connected via connectors 12 to a further flexible armoured hose 13 which leads via a valve 7 and connectors 8 to the end of a tubular passageway 9 into which the optical fiber member is to be introduced. The hoses 5 and 13 have the same internal diameter as the tubular passageway 9.

The vessel 1 contains the entire length of optical fiber member 6 which is to be introduced into the passageway 9. For simplicity of illustration only a small portion of the optical fiber member is shown, but it is to be understood that in practice the proportion of the volume of the vessel filled with optical fiber member is likely to be considerably greater than is shown. In FIG. 1 the optical fiber member is shown as being randomly deposited in the vessel. Alternatively, however, the optical fiber member could be held on a reel, as is illustrated in the case of the embodiment shown in FIG. 2 or in alternative formats to control tension and torsion during payout.

In one method of operation of the embodiment shown in FIG. 1 the leading end of the optical fiber member 6 is threaded manually through the tube 3, connectors 4, hose 5, connectors 10, venturi 11, connectors 12 and hose 13 as far as the valve 7, with the connectors 5 and 12 at this stage being disconnected to allow this to occur. The connectors 5 and 12 are then connected in air-tight manner and compressed air is introduced into the vessel 1 through the inlet 2. Valve 7 can be either closed or open, and while compressed air is being initially introduced this valve is kept shut so as to allow the pressure within the vessel to increase. When a sufficient pressure has been achieved within the pressure vessel the valve 7 is opened and air can pass at a relatively high initial speed from the vessel 1 into and through the passageway 9. The drag force exerted thereby on the optical fiber member propels it along the passageway, and the process continues until all except the trailing end portion of the optical fiber member 6 has passed into and along the passageway 9. During this process the compressed air supply can be maintained so as to keep the pressure within the vessel at a level sufficient to cause the optical fiber member to move at the required speed and for the required distance. However, provided there is sufficient air at sufficient pressure within the vessel 1 it may not be necessary to maintain the compressed air supply, since as long as the pressure within the vessel is significantly above atmospheric the optical fiber member will continue to be propelled along the passageway 9. The use of the flexible hoses 5 and 13 provides flexibility in locating the vessel 1 while the apparatus is being prepared for blowing.

The effect of the venturi is to exert a greater fluid dynamic force on the optical fiber member 6 as it passes through the venturi than it experiences once it enters the passageway 9. This has the result that there is slack in the optical fiber member upstream of the passageway, which is advantageous in terms of conveying the fiber. It is to be understood that this slack is continuously provided as the optical fiber member enters the passageway, not just provided to the leading end portion thereof.

Figure 2:
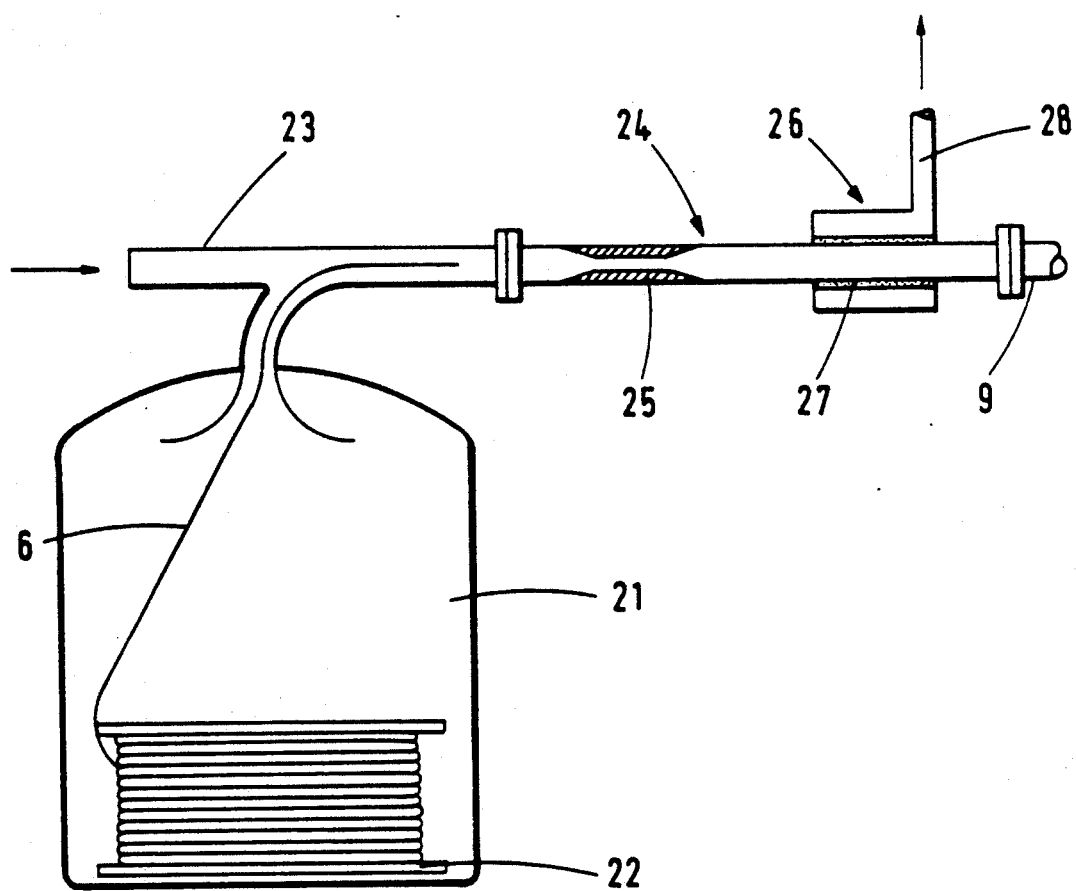
FIGS. 2 and 3 are diagrammatic views, partly in elevation and partly in vertical section, of a second embodiment and third embodiment respectively.

The embodiment shown in FIG. 2 comprises a vessel 21 which, like the vessel 1 in FIG. 1, is designed to withstand a high internal cyclic pressure. As in FIG. 1, a flow of air from the vessel 21 is used to propel an optical fiber member 6 into and along a passageway 9. In FIG. 2 the optical fiber is shown as being held on a reel 22, though it could be randomly deposited as in FIG. 1. The pressure vessel 21 is connected to the passageway 9 via a side-arm tube 23, to which a supply of compressed air is connected, and a venturi arrangement 24. Because the passageway 9 is of small cross-section, and therefore resists flow of air from the blowing head 10 into its upstream end, when the compressed air supply is turned on the pressure in the vessel 11 rises to substantially the pressure of the supply and stays at that pressure. The arrangement 24 comprises a venturi 25, similar to the venturi 11 in FIG. 1, and a venting device 26 by means of which a substantial part of the air entering the tube 23 is vented rather than passing down the passageway. The illustrated venting device 26 comprises an air-permeable tube 27 and an air outlet 28.

Further details of venturi devices can be found in our copending application filed on even date herewith and also entitled "Method and Apparatus for Blowing an Optical Fibre Member", Ser. No. 274,752.

Figure 3:
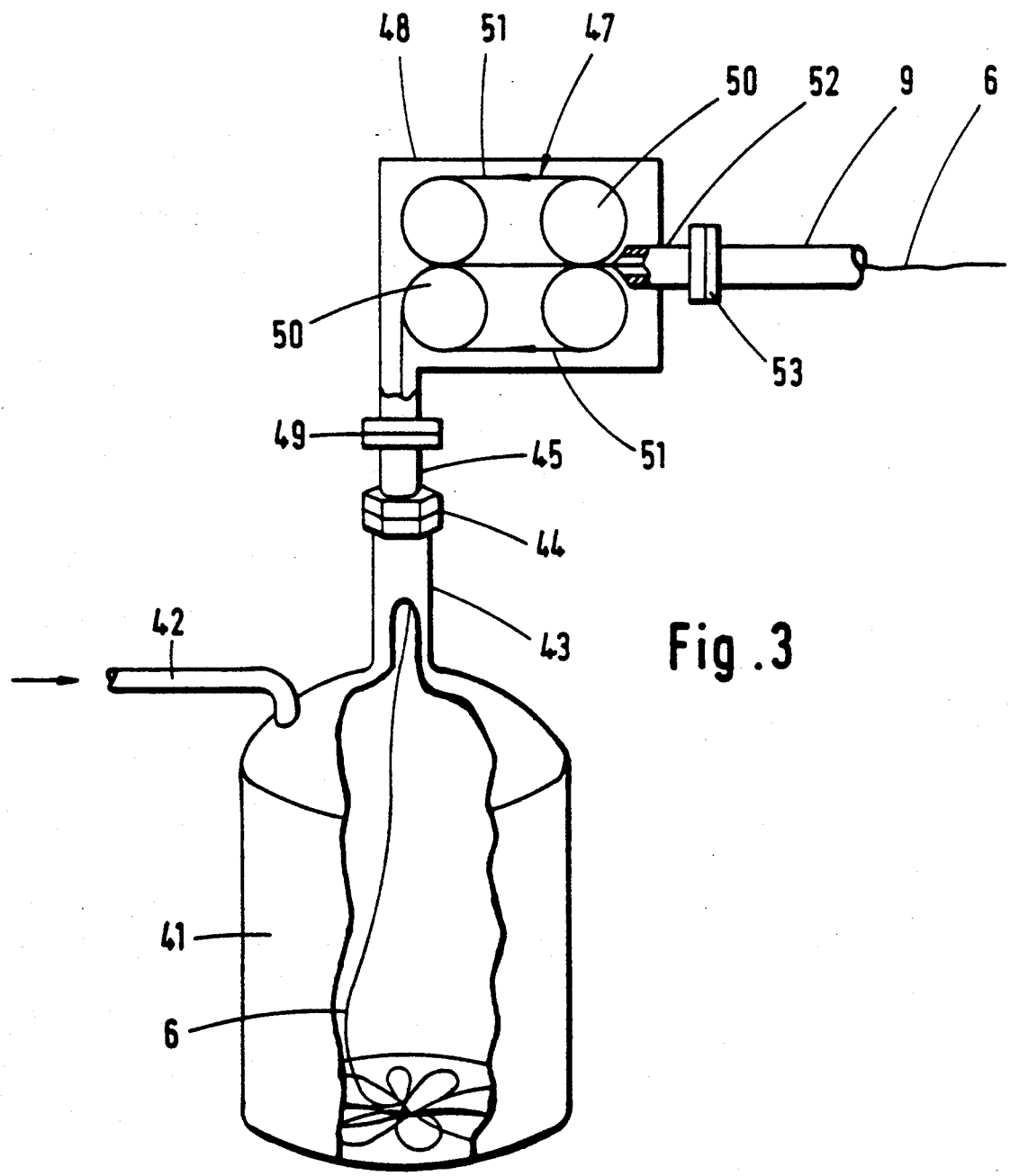

The embodiment of FIG. 3 has a pressure vessel 41 with an inlet 42 for compressed air. The vessel has an outlet tube 43 to which a flexible hose 45 is connected by connectors 44. Thus far it closely resembles the embodiment of FIG. 1. However, in FIG. 3 the venturi tube 11 is replaced by a caterpillar tractor arrangement 47 mounted in a chamber 48 the interior of which communicates with the hose 45 via connectors 49. The arrangement 47 comprises two pairs of rollers 50 and a pair of belts 51 each belt passing around a respective one of the pairs of rollers. The optical fiber member 6 which is to be introduced into the passageway 9 passes between, and is gripped by, the belts 51 which, in use, travel in a direction to feed the fiber member into a short length of tube 52, through which air is flowing in the direction of travel of the fiber member, assisting its introduction into the passageway 9. The length of tube 52 is connected by connectors 53 to the passageway 9. Tube 52 is similar in internal diameter to the passageway 9. The arrangement 47 provides slack in the optical fiber member upstream of the passageway 9, for the same purpose as the venturis in the first two embodiments.

Using any of the illustrated embodiments more than one optical fiber member may be blown simultaneously from a single vessel in a twisted or untwisted (layless) arrangement. Alternatively a plurality of optical fiber members may be blown simultaneously into a passageway from a corresponding plurality of vessels, by introducing them into the passageway through a manifold. An option is to use one long length stored within the vessel to complete more than one installation, each in a different passageway. A further option entails pulsing the air flow, for example by switching the air supply or by venting, in order to assist in moving the fiber member. Yet a further option is to provide mechanical vibration of the upstream end of the passageway 9, or fiber member, to further assist in moving the fiber member.

The invention as described above has a number of advantages over the blowing technique of EP-A-108590 in addition to those already indicated. Thus, the need for an electrical power supply to the blowing head is eliminated, making it more suitable for work in hazardous areas, e.g. flammable atmospheres. The vessels which contain the fiber member provide protection for it, provided the pressurised air supply is clean, from mechanical and environmental hazards during transport and installation. Also the installation method can be relatively quiet. In the case of the first two embodiments there need be no moving parts. The first two embodiments have further advantages which derive from the fact that the devices used for introducing the fiber member into the passageway derive force from the viscous drag of air over the entire surface of the fiber member. Because of this the force is low and uniform and is maintained regardless of speed of the member. Thus the introducing device is tolerant of changes of speed and only operates at low stress in either tension or compression.

There is, of course, a limit to the length of fiber member which can be blown by the apparatus described above. This limit will vary depending on the precise characteristics of the apparatus and of the fiber member being blown. For convenience of description let us suppose that the limit in particular circumstances is 1 km. If it is desired to blow a longer length of fiber member this can be achieved by having an appropriate number of blowing apparatuses spaced at intervals along the intended path of the fiber member at 1 km intervals. Thus, for example, to install a fiber member 5 km in length one would have five such apparatuses, one at the beginning and the other four spaced at 1 km intervals therefrom. In addition, four fiber receiving units are required, for example in the form of fiber coiling machines, one associated with each of the four blowing apparatuses excluding the one at the beginning.

The way in which the above mentioned 5 km length of fiber member is blown is as follows. First, the blowing apparatus at the beginning is used to blow the fiber member into and through the first 1 km section of passageway extending from the first blowing apparatus to the location where the second blowing apparatus is situated, so that 4 km of fiber emerges from the downstream end of this section of passageway and is taken up as it emerges on the coiling machine situated there. This 4 km length of fiber member is then placed in the vessel of the second blowing apparatus, which not only has a fiber outlet (corresponding to the outlet tube 3 of FIG. 1) but also a fiber inlet. At the inlet there is a seal to ensure that the required pressure can be maintained in the vessel, and the free end of fiber member is introduced into the fiber outlet. The 4 km length of fiber member is then blown from the vessel of the second blowing apparatus so that 3 km of fiber member arrives at the location of the third blowing apparatus. This process is repeated with 2 km of fiber member reaching the fourth blowing apparatus, 1 km reaching the fifth blowing apparatus, and the leading end of the fiber member reaching the end of the 5 km path.

It will be appreciated that the process just described will result in the fiber member being threaded through the vessels of all the blowing apparatuses except that at the beginning. To enable these apparatuses to be removed for reuse, each vessel is preferably split in a suitable manner. For example, each vessel can be formed of a container and a removable fitted lid, with the fiber inlet and fiber outlet both being formed in the lid, and the lid can be split into two parts along a plane passing through the fiber inlet and fiber outlet.

We claim:

1. An apparatus for introducing at least one optical fiber member into a tubular passageway, comprising a pressure vessel for containing a supply of the optical fiber member, the vessel either containing a gas under super-atmospheric pressure or being provided with an inlet by means of which such gas can be introduced; means defining a path for the optical fiber member to travel from the vessel into the tubular passageway; and fiber introducing means for exerting a fluid dynamic force on the optical fiber member to create slack in the optical fiber member as it travels along said path.

2. An apparatus according to claim 1, wherein the fiber introducing means comprises a venturi.

3. An apparatus according to claim 1, comprising a reel disposed within the pressure vessel, on which reel the optical fiber member is held.

4. An apparatus according to claim 1, wherein the said gas is air.

5. An apparatus according to claim 1, wherein the path-defining means comprises at least one flexible member.

6. An apparatus for introducing at least one optical fiber member into a tubular passageway, comprising;
    a pressure vessel for containing a supply of the optical fiber member, said vessel further containing a gas at super-atmospheric pressure;
    means defining a path for the optical fiber member and said gas to travel from the vessel into the tubular passageway; and
    fiber introducing means for exerting by said traveling gas a fluid dynamic force on the surface of said optical fiber member to create slack in the optical fiber member as said fiber member and gas travel along said path.

7. An apparatus according to claim 6, wherein the fiber introducing means includes a venturi.

8. An apparatus according to claim 6, further comprising a reel disposed within the pressure vessel, on which reel the optical fiber member is held.

9. An apparatus according to claim 7, wherein said gas is air.

10. An apparatus according to claim 7, wherein the path-defining means includes at least one flexible member.

11. An apparatus for introducing at least one optical fiber member into a tubular passageway, comprising;
    a pressure vessel for containing a supply of the optical fiber member, the vessel being provided with an inlet through which pressurized gas can be introduced to said vessel;
    means defining a path for the optical fiber member and said gas to travel from the vessel into the tubular passageway; and
    fiber introducing means for exerting by said traveling gas a fluid dynamic force on the surface of said optical fiber member to create slack in the optical fiber member as said fiber member and gas travel along said path.

12. An apparatus for introducing at least one optical fiber member into a tubular passageway, comprising:
    a pressure vessel for containing a supply of the optical fiber member, said vessel having a gas at super-atmospheric pressure;
    conduit means defining a path for the optical fiber member to travel from the vessel into the tubular passageway;
    and fiber introducing means in said conduit means for exerting a fluid dynamic force on the optical fiber member to create slack in the optical fiber member as it travels along said path.

* * * * *